W. F. Goodwin,
Mechanical Movement.
N° 81,271.   Patented Aug. 18, 1868.
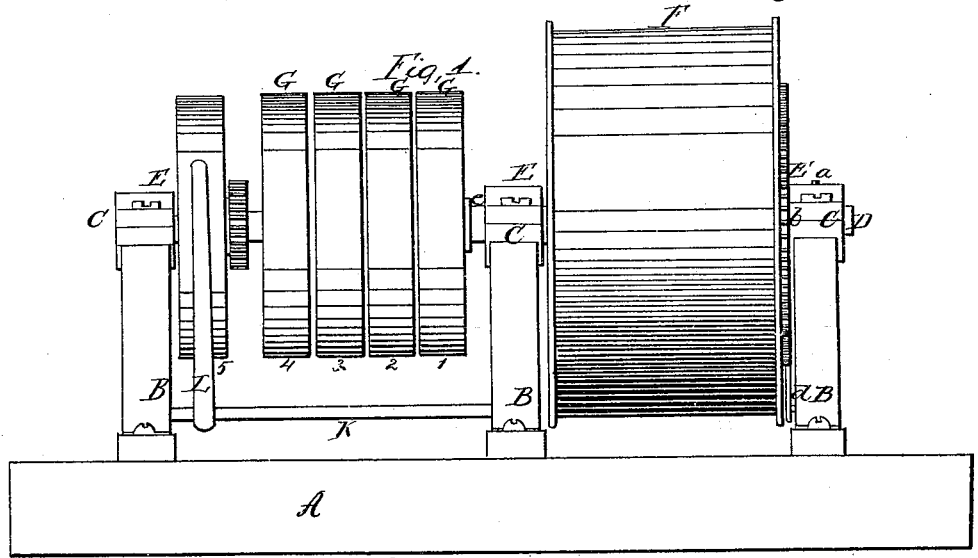
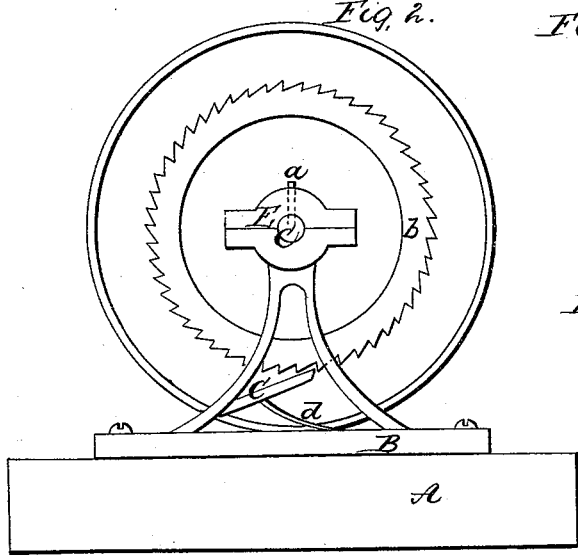
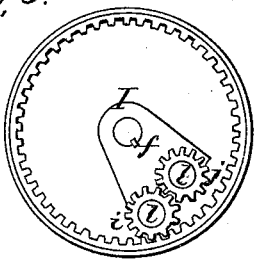
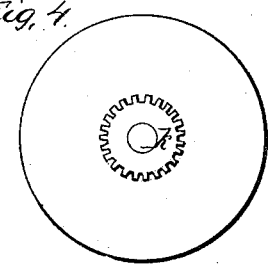
Witnesses,
Inventor,
Wm F Goodwin
by J C Thenker atty 2 Sheets, Sheet 2

W. F. Goodwin,
Mechanical Movement.
Nº 81,271. Patented Aug. 18, 1868.

Witnesses,
J. C. Theaker
Am Stout Jr

Inventor
Wm F Goodwin
by J C Theaker atty

United States Patent Office.

WILLIAM F. GOODWIN, OF EAST NEW YORK, N. Y.

Letters Patent No. 81,271, dated August 18, 1868.

---

IMPROVED MECHANICAL MOVEMENT.

---

*The Schedule referred to in these Letters Patent and making part of the same.*

---

TO ALL WHOM IT MAY CONCERN:

Be it known that I, WILLIAM F. GOODWIN, of East New York, in the county of Kings, and State of New York, have invented a new and useful Improvement in Mechanical Movements for hoisting-machines, turning-lathes, and other purposes; and I do hereby declare that the following is a full, clear, and exact description thereof, reference being had to the accompanying drawings, in which—

Figure 1 is a side elevation of a hoisting-machine embodying my improvement.

Figure 2 is an end elevation of the same.

Figure 3 is a side view of one of the pulleys, showing the internal cogs of the same, and also the fixed arm and the intermediate gear-wheels on the same.

Figure 4 is a view of the opposite side of the pulley from that shown in fig. 3, and shows its wheel or pinion, which is attached rigidly thereto.

Figure 5:
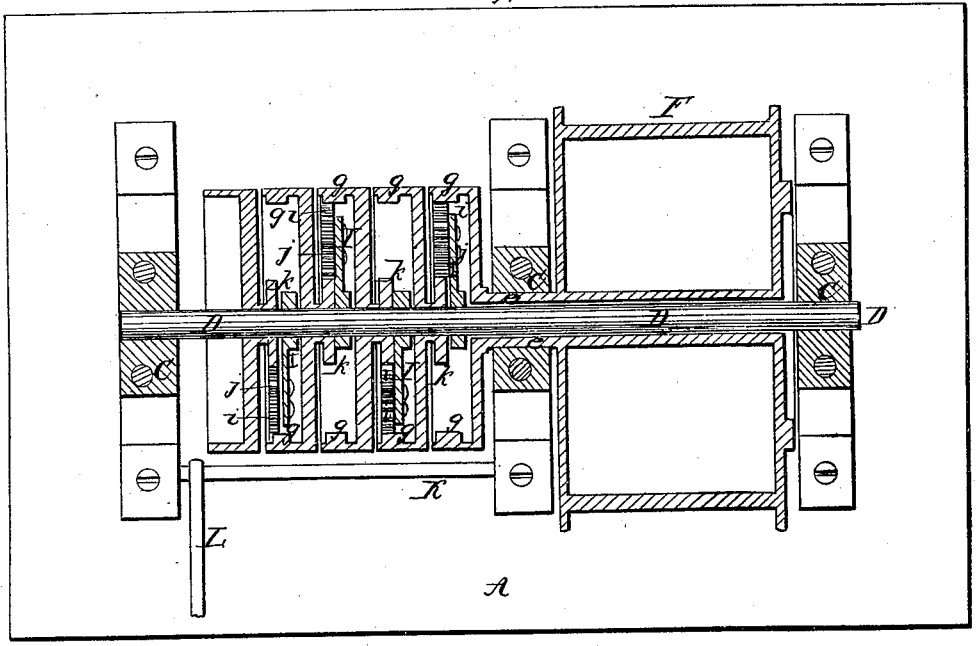
Figure 5 represents a horizontal section through the whole machine, showing the arrangement of a series of pulleys and their pinions, and also the fixed arms and their pinions or wheels.

In order to enable others skilled in the art to which it appertains to make and use my invention, I will describe it, as follows, viz:

I construct a suitable frame or base, A, upon which I secure the stands B B B, made of any suitable size and form, and of any desired material, and on the top of said stands are bearings, C, in which the stationary or non-revolving shaft D is placed, and there secured by the caps E, in the usual manner. There is a pin in one of these caps, extending through the same and into the said shaft, as shown at $a$, fig. 2, which prevents the shaft from turning.

On shaft D, I place the drum F, on one end of which is a ratchet, $b$, and pawl $c$ and spring $d$, all shown in fig. 2. The opposite end of said drum F has a boss or sleeve at its centre, extending through or across the middle bearing, and on the end of this boss or sleeve is rigidly placed the first of the series of pulleys, G. This first pulley of course revolves with the drum F, the middle bearing being made, and bored out large enough to allow this sleeve or boss $e$ of the drum to revolve freely in it, as seen at $e$, fig. 5. That part of the shaft D upon which the pulleys G are placed is grooved or splined for the reception of keys, as seen at $f$, fig. 3. These pulleys G are provided with a circle of internal cogs, as seen at $g$, figs. 3 and 5.

Upon the said shaft D, I place the arms I, as seen at $f$, figs. 3 and 5. These arms are so placed on the shaft that they can be moved longitudinally on it at pleasure, but at the same time they are prevented from rotating on it by means of the keys, which are rigidly placed in their seats in said arms, so that they will move back and forth longitudinally on the shaft as the arms in which they are placed move, but at the same time they will prevent their rotating, as the said keys are in their seats both in the shaft and in their respective arms, as seen at $f$, fig. 3.

On these arms I are placed the wheels or pinions $i$ and $j$, figs. 3 and 5, $i$ gearing into the internal cogs, $g$, of the pulley, and $j$ being an intermediate pinion, gearing into $i$, and also into the pinion $k$, figs. 4 and 5, of the next pulley in the series. This pinion $k$ is rigidly attached to the opposite side of the pulley from the circle of internal cogs $g$, (see figs. 4 and 5,) and in all the pulleys of the series except the first, which is rigidly attached to the large drum, as before explained. These pinions work on appropriate studs in said arms, as seen at $e$ $e$, fig. 3.

I extend a rod or bar from the middle stand, B, to the stand at the outer end of the shaft D, as seen at K, figs. 1 and 5; and on this bar I place an arm, L, figs. 1 and 5, said arm being so placed and fitted to the bar that it will move freely from end to end of the same, and at the same time swing up and down on it.

The operation of my machine is as follows, viz:

When but a small power is desired, I put the driving-belt on pulley No. 1, and as it is rigidly attached, as described, to the large drum, the latter must revolve with the pulley by which it is driven. When more power is required, I move the driving-belt from pulley No. 1 to No. 2, and as it revolves, its pinion $k$, gearing into pinion $j$ on the arm I, operates it, and it gearing into $i$, on same arm, turns the latter, and it gearing into the circle of internal cogs $g$ of pulley No. 1, revolves the same, and thus the revolving of pulley No. 2 operates pulley No. 1 and the drum to which it is attached, and as pinion $k$ has one-third the number of cogs that is in the circle of internal cogs $g$ of pulley No. 1, it follows that the motion of No. 1 is one-third of No. 2, and of course its power three times as great. Now, if we desire still further to increase the power of the machine, we move the driving-belt from pulley No. 2 to No. 3; and as all the pinions connecting each pulley of the whole series to the one next to it are the same, it follows that the moving of the driving-belt from No. 2 to No. 3 will increase or treble the power got by running the belt on pulley No. 2, making it nine times that obtained by using it on No. 1, and in any change of the driving-belt from any one of the pulleys to the next superior number in the series, its power is thereby trebled and its motion correspondingly diminished.

From the above description, it appears plainly that by increasing the series of pulleys and their pinions, any desired increase of power and decrease of motion can be had, and therefore my invention is applicable to hoisting-machines, turning-lathes, and other purposes for which an increase of power or decrease of motion, or both, is desirable.

The use of two intermediate pulleys on the arms I, instead of one, is to secure the motion of all the pulleys in the same direction, which would not be the case if but one were used.

When it is desired to detach any one or more of the pulleys G, when their use is not desired, I move them longitudinally, on the shaft D, from those desired to be used, and then move the arm L to a point on the bar K opposite to the point of desired separation of the pulleys, and then raise or swing it up towards the shaft D, placing it between the pulleys desired to be separated, thus preventing their contact with each other, as seen at fig. 1.

Having fully described the manner of using my invention, what I claim, and desire to secure by Letters Patent, is—

1. The drum F, with its ratchet $b$ and pawl $c$, in combination with two or more of the series of pulleys G, all substantially as shown and described.

2. The combination of two or more of the series of pulleys G with their circles of internal cogs $g$, external pinion $k$, and intermediate pinions $i$ and $j$, and arm I, substantially as shown and described.

3. The arm I, carrying the pinions $i$ and $j$, in combination with the shaft D, both so constructed that the said arm will move freely on the said shaft longitudinally, but will not revolve upon it, substantially as and for the purposes shown and described.

4. The combination of two or more of the series of pulleys G with the non-revolving shaft D and arm or arms I, all as shown and described.

WM. F. GOODWIN.

Witnesses:
T. C. THEAKER,
ALEX. OSTRANDER.